(12) United States Patent
Deao et al.

(10) Patent No.: US 7,020,600 B2
(45) Date of Patent: Mar. 28, 2006

(54) APPARATUS AND METHOD FOR IMPROVEMENT OF COMMUNICATION BETWEEN AN EMULATOR UNIT AND A HOST DEVICE

(75) Inventors: Douglas E. Deao, Sugar Land, TX (US); Gary L. Swoboda, Sugar Land, TX (US)

(73) Assignee: Texas Instruments Incorporated, Dallas, TX (US)

( * ) Notice: Subject to any disclaimer, the term of this patent is extended or adjusted under 35 U.S.C. 154(b) by 822 days.

(21) Appl. No.: 09/949,265

(22) Filed: Sep. 7, 2001

(65) Prior Publication Data

US 2003/0056027 A1    Mar. 20, 2003

(51) Int. Cl.
G06F 9/455    (2006.01)

(52) U.S. Cl. ............................ 703/27; 703/26; 703/28; 714/28; 717/138

(58) Field of Classification Search ............ 703/23–28; 714/28
See application file for complete search history.

(56) References Cited

U.S. PATENT DOCUMENTS

| | | | | |
|---|---|---|---|---|
| 4,514,803 A | * | 4/1985 | Agnew et al. ................. | 703/26 |
| 5,388,060 A | * | 2/1995 | Adams et al. ................. | 703/27 |
| 5,684,721 A | * | 11/1997 | Swoboda et al. ............. | 703/23 |
| 5,953,516 A | * | 9/1999 | Bonola ........................ | 703/24 |
| 6,094,729 A | * | 7/2000 | Mann ........................... | 714/25 |
| 6,606,590 B1 | * | 8/2003 | Swoboda et al. ............. | 703/28 |
| 6,611,796 B1 | * | 8/2003 | Natarajan et al. ............ | 703/28 |
| 6,820,051 B1 | * | 11/2004 | Swoboda ...................... | 703/28 |
| 2001/0034597 A1 | * | 10/2001 | Swoboda et al. ............. | 703/26 |
| 2002/0133810 A1 | * | 9/2002 | Giles et al. .................. | 717/138 |

OTHER PUBLICATIONS

Klapuri et al., H. Mapping Artificial Neural Networks to a Tree Shape Neurocomputer, Microprocessors and Microsystems, vol. 20, No. 5, Sep. 1996, pp. 267-276.*
Vlahavas, I. Exploiting and-or Parallelism in Prolog: The OASys Computational Model and Abstract Architecture, Journal of Systems and Software, vol. 43, No. 1, Oct. 1998, pp. 45-57.*

* cited by examiner

Primary Examiner—Russell Frejd
(74) Attorney, Agent, or Firm—William W. Holloway; W. James Brady; Frederick J. Telecky, Jr.

(57) ABSTRACT

In order to reduce the traffic over the communication bus between the host processing unit and an emulator server unit during the test of a target processing unit, the commands are divided into groups of test commands. A group of commands is transferred to the emulator server unit and stored in a memory unit of the emulator server unit. The emulator server unit then applies each command of the group of commands to a target processing unit. The resultant data generated as a result of the application of each command is stored in the emulator server unit. When all the commands of the group of commands have been executed by the target processing unit and the resultant data stored in the emulator server unit, the resultant data is transferred to the host processing unit in a single communication bus access.

17 Claims, 3 Drawing Sheets

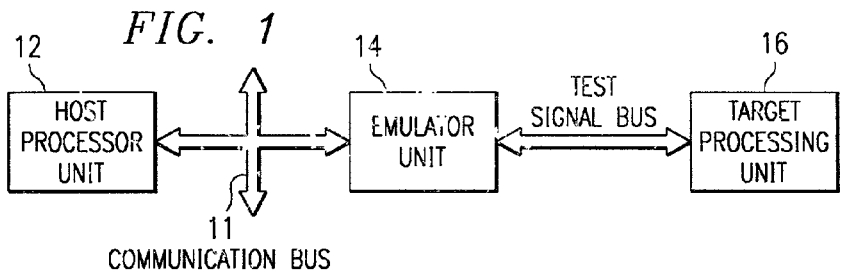
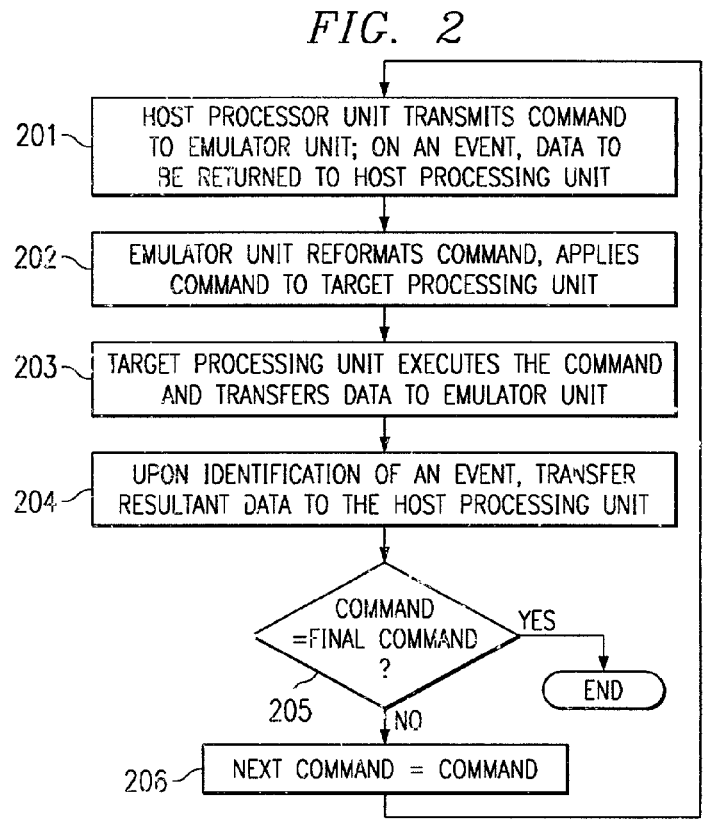
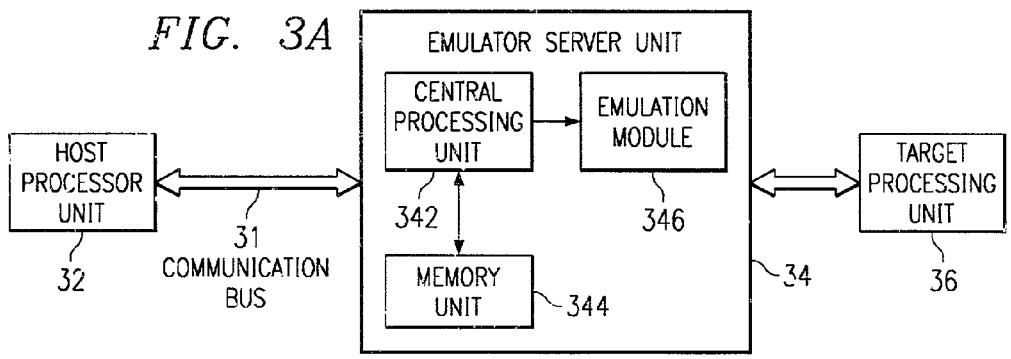

APPARATUS AND METHOD FOR IMPROVEMENT OF COMMUNICATION BETWEEN AN EMULATOR UNIT AND A HOST DEVICE

BACKGROUND OF THE INVENTION

1. Field of the Invention

This invention relates generally to digital signal processing units and, more particularly, to techniques for test signal transfer between the host processor and the test system, the test system including an emulator unit and a target processor unit.

2. Background of the Invention

As digital signal processor units and the software programs that are executed thereon have become more complex, the testing of both the hardware apparatus and the software programs has become increasingly difficult. The expanding number of components implementing the digital processing units results in a correspondingly expanding number of potential problems. Furthermore, a tendency to fragmentation of the testing procedures among the system has developed. In an attempt to standardize the testing procedures, the JTAG (Joint Test Action Group) protocols have been developed. The JTAG protocols provide standardized test procedures that can be used with a wide variety of processing unit platforms. The protocol consists of standardized commands to which standardized responses are expected. Any departure from the expected response indicates the presence of a error.

The testing procedure can be understood by reference to FIG. 1. A host processor 12, in association with an integrated development environment (IDE), generates a command that will test or provide a debug access to a portion or a function of a target system or a target processor peripheral unit 16. The command generated by the host processor unit 12 is transferred to the emulator unit 14 by communication bus 11. In the emulator unit, the command is reformatted to a command or commands that can be executed by the target processing unit 16. The target processing unit 16 executes the reformatted command and transfers the resultant data to the emulator unit 14. When the emulator unit 14 has all of the resultant data, the emulator unit 14 transfers the resultant data to the host processor unit 12 by the communication bus 11. The host processor unit then analyzes the data to determine whether the execution of the command by the target processor unit 16 was accurate.

Referring to FIG. 2, a more detailed description of the debug and test process for validating a target system or target processor application unit is shown. In step 201, the host processor transmits a command to the emulator unit. The command includes whatever data is necessary for implementation of the command. Included in the command is the instruction that, upon a preselected event, the results of executing the command by the target processing unit command will be transferred to the host processing unit. The emulator unit reformats the command from the host processing unit into a format that is executable by the target processing unit and applies the reformatted instruction to the target processing unit in step 202. In step 203, the target processing unit executes the applied command and transfers the resultant data, i.e., the data resulting from the execution of the command, to the emulator unit. Upon the identification of the event specified in step 201, the resultant data is transferred to the host processor unit in step 204. The event is either the completion of the execution of the command or an event related to the completion of the execution of the command. In step 205, a determination is made by the host processing unit whether the command for which the data has been received in the last command in the test sequence. If the command for which the resultant data has been received is the last data in the sequence of commands to be applied to the target processing unit, the delivery of commands to the target processing unit is ended. When in step 205, the just completed command is not the last command in the sequence to be applied to the target processing unit, then the process proceeds to step 206. In step 206, the next command in the sequence of commands to be applied to the target processing unit becomes the (current) command and the process proceeds to step 201 wherein process is repeated.

While the foregoing process can provide a suitable technique for testing hardware and software components by a host processing unit, one problem that is encountered is the traffic between the emulator unit 14 and the host processor unit 12. As is clear from the foregoing description, the host processor issues one command to the emulator unit 14 requiring activity over the communication bus 11. When the results of the execution of the command executed by the target processing unit 16 are complete, a second access to the communication bus 11 is required to transfer the resultant data from the emulator unit 14 to the host processing unit 12. The host processor then repeats process for the next command. Thus, the testing of the target processing unit 16 requires two communication bus 11 accesses for each command tested. The traffic on the communication bus 11 typically has components in addition to the traffic between the host processing unit 12 and the emulator unit 14. The frequent communication between the host processing unit 12 and the emulator unit 14 can interfere with other traffic over the communication bus 11.

A need has therefore been felt for apparatus and an associated method having the feature that the communication between the host processor and the emulator unit over the communication bus can be improved. It would be a further feature of the apparatus and associated method to reduce the traffic between the host processing unit and the emulator unit during the testing of a target processing unit.

SUMMARY OF THE INVENTION

The aforementioned and other features are accomplished, according to the present invention, by arranging the commands provided to the emulation unit into groups of commands. Each group of commands includes the instruction that, when an event is identified, the resultant data will be transferred to the host processing unit. The event occurs when all the instructions in the group have been executed. The emulator server unit stores the group of commands and the instruction. The emulator unit, upon receiving the group of commands, will transmit to the target processing unit, the individual commands identified by the group of commands in sequence. Each command transmitted to the target processing unit is executed by the target processor unit and the resultant data returned to and stored in the emulator server unit before the next command, in the group of commands, is transmitted to the target processor unit. When all of the commands included in the group of commands have been executed by the target processor unit and the resultant data returned to the emulator server unit, the emulator server unit then returns, upon identification of the event included in the group of commands, all the resultant data to the host processing unit with a single bus access.

Other features and advantages of present invention will be more clearly understood upon reading of the following description and the accompanying drawings and the claims.

BRIEF DESCRIPTION OF THE DRAWINGS

FIG. 1 is a block diagram of the apparatus used in testing a target processor unit according to the related art.

FIG. 2 is a flow chart illustrating the execution of a test command according to the related art.

FIG. 3A is a block diagram of the apparatus used in testing a target processor according to the present invention, while

DESCRIPTION OF THE PREFERRED EMBODIMENT

1. Detailed Description of the Figures

Figure 3B:
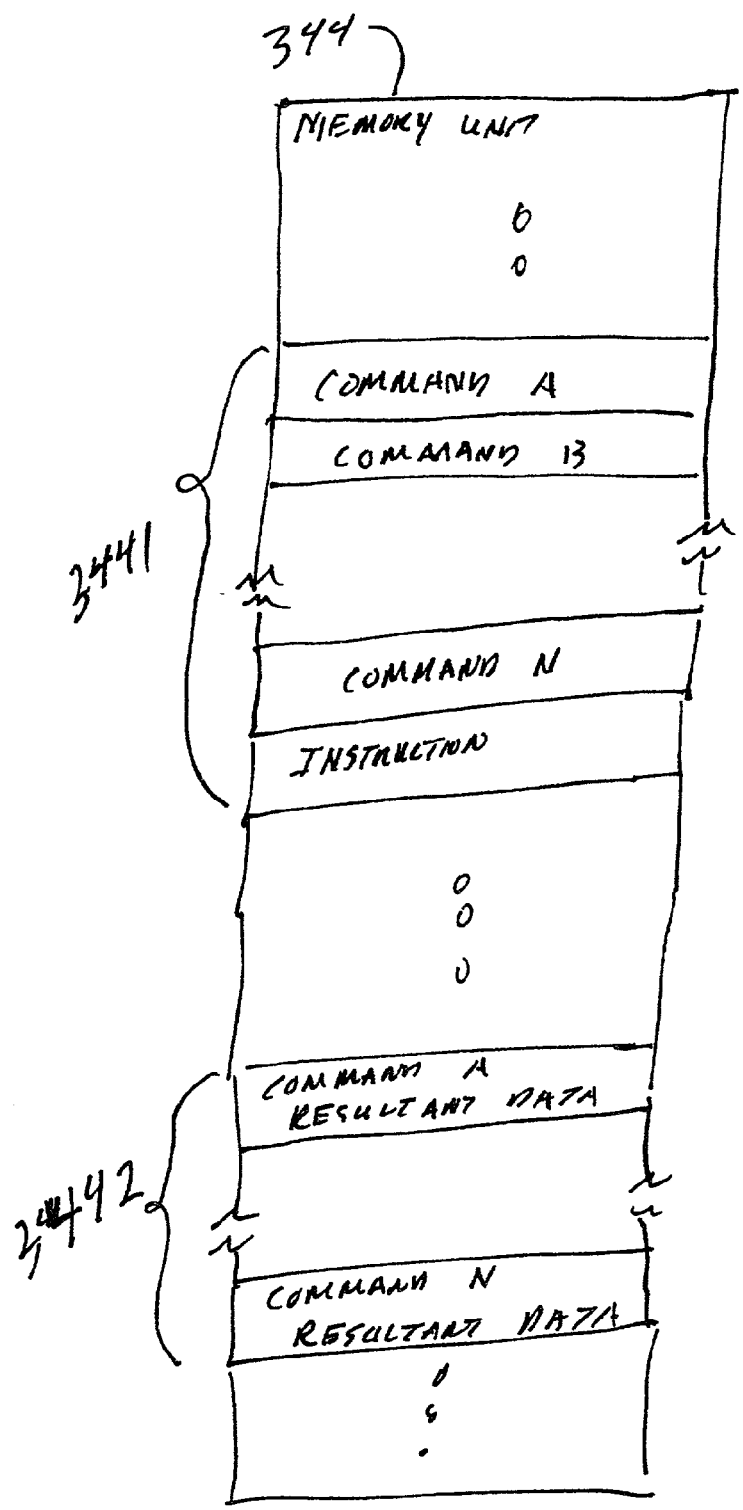
FIG. 3B illustrates the structure of the files in the memory unit of the emulator server unit according to the present invention.

FIG. 1 and FIG. 2 have been discussed with respect to the related art.

Referring to FIG. 3A, the block diagram shown in FIG. 1 is repeated with additional apparatus indicated according to the present invention. When testing of the target processing unit 36 is initiated, the host processing unit 32 applies a group of commands along with the return data on event instruction to the communication bus 31 coupled between the host processor and the emulator service unit 34. In response to the group of commands, the group of commands is stored in the memory unit 344. Under control of the central processing unit 342 in the emulator server unit 34, the first command in the group of commands is accessed and applied to the emulation module 346. The emulation module 346 reformats the command, when necessary, and applies the reformatted command to the target processing unit 36. The target processing unit 36 executes the command and sends the resultant data back to the emulator service unit 34 for storage in the memory unit 344. The central processing unit 342 extracts the next command from memory unit 344 and applies the command to the emulation module 346. The command is executed and the resultant data returned to the emulator server unit 34 and stored in the memory unit 344. The procedure is continued until all of the group of commands from the memory unit 344, applied to the target processor unit 36, and the resultant data is stored in the memory unit 344. After all of the resultant data has been stored in the memory unit 344 and upon the occurrence of the event transferred with the group of commands, all of the resultant data is transferred to the host processing unit 32 for analysis.

Referring to FIG. 3B, the format of the memory unit 344 is shown. When the group of commands is forwarded to the emulation server 34, the commands, command A through command N and the instruction to return the resultant data to the host processing unit are stored in the memory locations 3441. The resultant data from each of the stored commands is stored in a separate group of memory locations 3442. When all of the group of commands has been executed and the resultant data stored in the memory unit 3442, then the resultant data is transferred, in response to the return resultant data instruction, to the host processing unit 32.

Figure 4:
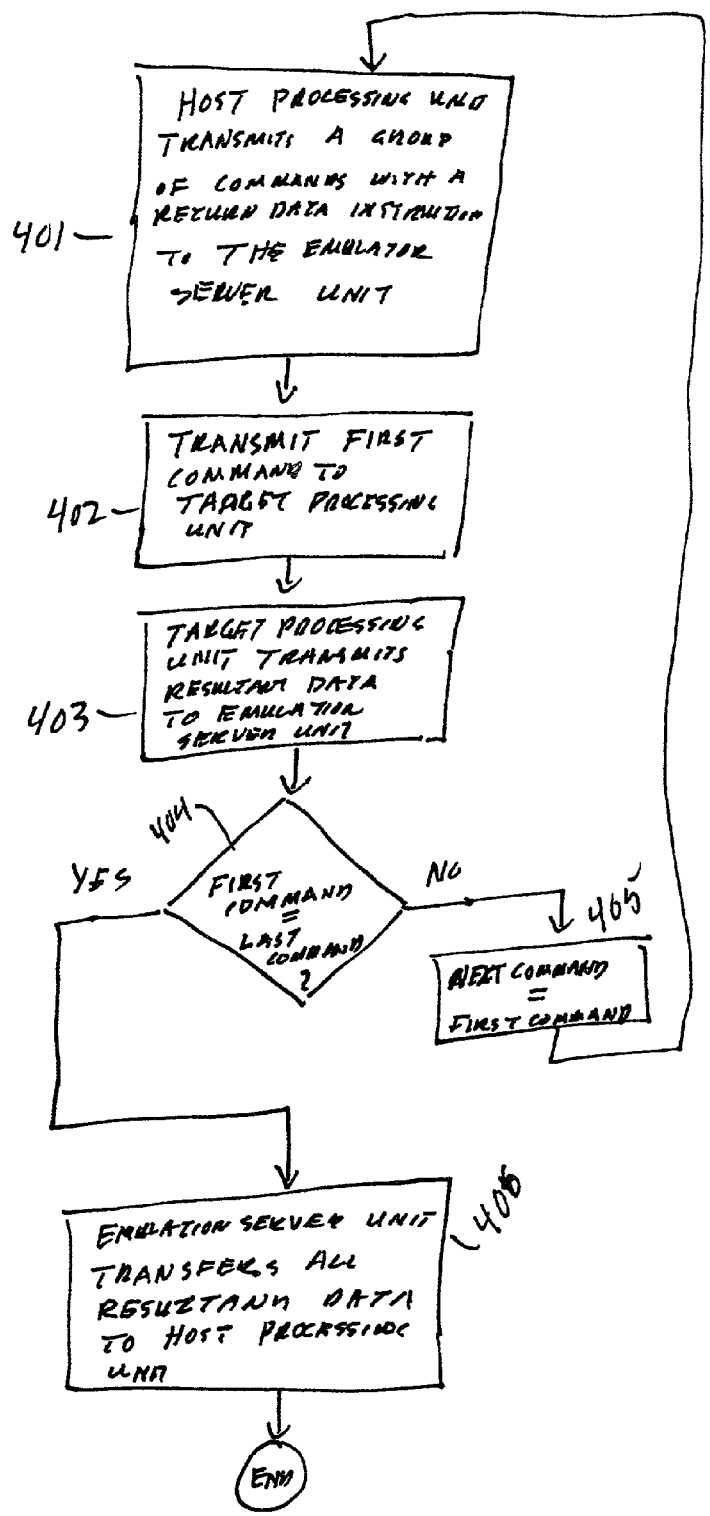
FIG. 4 is flow chart illustrating the execution of a test command group according to the present invention.

Referring to FIG. 4, the procedure for testing a target processor unit, according to the present invention, is shown. In step 401, the host processor transfers a group of commands to the emulator server unit. The group of commands includes an instruction that, when all the commands in the group of commands is complete and the resultant data has been stored in the emulation unit, all of the resultant data is to be returned to the host processing unit. In step 402, the emulation server unit transmits the first command to the target processing unit. The target processing unit executes the first command and returns the resultant data to the memory unit of the emulator server unit in step 403. Then the central processing unit of the emulator server unit determines whether the current first command is the last command of the group of commands in step 404. When the current first command is the last command of the group, then the emulation server unit transmits all of the resultant data in the memory unit to the host processing unit and the processes ends. When, in step 404, the current first command is not the last command of the group of commands, then, in step 405, the next command in the sequence of commands becomes the current first command, and the process returns to step 401.

2. Operation of the Preferred Embodiment

In the present invention, the host processing unit transfers to the emulator server unit a group of commands to test the target processing unit. The group of commands can be transmitted to the emulator server unit in one access of the communication bus. The group of commands includes the instruction that, after all of the commands of the group of commands has been executed, the resultant data generated as a result of the execution of the commands is to be transferred to the hast processing unit in a single communication bus access. Each of the commands is then applied in sequence to the target processing unit where the command is executed. The resultant data, generated as a result of the execution of the command, is transferred to the emulator server unit where it is stored. After the last command in the sequence has been executed, the instruction is implemented and all of the resultant data is transferred to the host processing unit. In the host processing unit, the resultant data is analyzed to determine whether the operation of the target processing unit in executing each command has been free from error.

In the present invention, two communication bus accesses are needed to test the target processing unit with a group of commands and to return the resultant data to the host processing unit. The first access of the communication bus transfers the group of commands from the host processing unit to the emulation server unit. The second access transfers the resultant data resulting from execution of all of the commands from the emulator unit to the host processing unit. In contrast, the typical testing arrangement involves one communication bus access to transfer each command to the emulator unit and one communication bus access to transfer the resultant data from the emulator unit to the host processing unit. Therefore, the number of communication bus accesses that are saved by the present invention is 2(N−1), where N is the number of commands in the group of commands.

An example of a group of test commands could be the following:
READ REGISTERS
READ PROGRAM MEMORY BLOCK @ PC+OFFSET
READ DATA MEMORY @ SP+OFFSET
READ MEMORY @ FIXED LOCATION
READ IO MEMORY @ FIXED LOCATION While the invention has been described with respect to the embodiments set forth above, the invention is not necessarily limited to these embodiments. Accordingly, other embodiments, variations, and improvements not described herein are not necessarily excluded from the scope of the invention, the scope of the invention being defined by the following claims.

What is claimed is:

1. Apparatus for testing a target system unit by a host processing unit, the host processing unit coupled to a communication bus; the apparatus comprising:
an emulator service unit coupled to the communication bus, the emulator service unit storing a group of commands, the emulator service unit sequentially applying each command of the group of commands to the target processing unit, the target processing system applying resultant data resulting from execution of each command to the emulator service unit, the emulator service unit storing the resultant data, the emulator service unit transferring the resultant data resulting from the execution of a plurality of commands of the group of commands to the host processor during a single communication bus access.

2. The apparatus as recited in claim 1 wherein the group of commands is transferred from the host processing unit to the emulator service unit during a single access of the communication bus.

3. The apparatus as recited in claim 2 wherein the emulator service unit applies a next sequential command to the target system unit after receipt of the resultant data resulting the execution of the previous command.

4. The apparatus as recited in claim 2 wherein the emulator service unit includes a memory unit, the memory unit storing the groups of commands to be applied to the target processing unit, the memory unit storing the resultant data from the execution of a by the target system.

5. The apparatus as recited in claim 1 wherein the target system is an integrated circuit digital signal processing unit.

6. The apparatus as recited in claim 2 wherein the group of commands includes an instruction to transfer the resultant data from the emulator service unit to the host processing unit upon identification of an event.

7. The apparatus as recited in claim 1 wherein all of the resultant data resulting from the execution of the all of the group of commands is transferred to the host processing unit in a single access of the communication bus.

8. A method of testing a target processing system in a system having a host processor unit, an emulator service unit, and a communication bus coupling the host processing unit and the emulator service unit, the method comprising:
storing a group of commands in an emulator service unit;
applying each the commands of the group of commands stored in the emulator unit in sequence to the target processing unit;
storing the resultant data resulting from the execution of each command in the emulator service unit; and
transferring the resultant data from a plurality of commands stored in the emulator service unit to the host processor during a single communication bus access.

9. The method as recited in claim 8 wherein the resultant data from all of the commands of the group of commands stored in the emulator service unit is transferred to the host processor unit during a single access of the communication bus.

10. The method as recited in claim 8 wherein a next command is applied to target processor unit after the resultant data from the previous command is stored in the emulator service unit.

11. The method as recited in claim 8 wherein the group of commands is transferred from the host processing unit to the emulator service unit during a single communication bus access.

12. The method as recited in claim 8 wherein the group of commands includes an instruction for the transfer of the resultant data from the emulator service unit to the host processing unit upon the occurrence of an event.

13. A system for testing a target processing system, the system comprising:
a host processing unit;
a communication bus coupled to the host processing unit; and
an emulator service unit coupled to the communication bus, the emulator service unit storing at least one group of commands, wherein the emulator service unit applies each of the commands in the group of commands to the target processing system, the target processing system executing the command applied thereto, the target system transferring resultant data resulting from execution of the command to the emulator service unit, the emulator service unit storing the resultant data therein, the emulator service unit transferring the resultant data from a plurality of commands to the host processing unit in a single communication bus access.

14. The system as recited in claim 13 wherein the emulator service unit transfers all of the resultant data to the host processor unit in a single communication bus access after the resultant data from all of the commands of the group of commands has been stored in the emulator service unit.

15. The system as recited in claim 14 wherein the emulator service unit applies the next sequential command to the target processing system after storage of the resultant data from the previous command therein.

16. The system as recited in claim 13 wherein all of the group of commands stored in the emulator service unit are transferred from the host processing unit in a single communication bus access.

17. The system as recited in claim 13 wherein the target processing unit is an integrated circuit.

* * * * *